(No Model.)
C. M. ROUSE.
COMBINED RIDING HARROW AND ROLLER.
No. 402,975. Patented May 7, 1889.
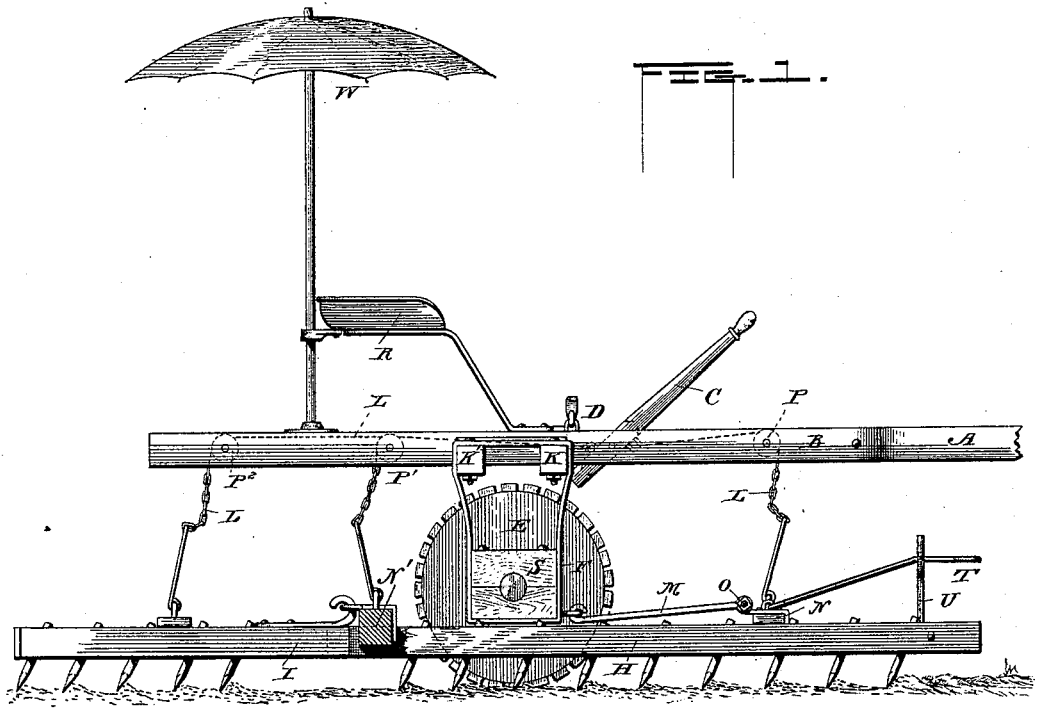
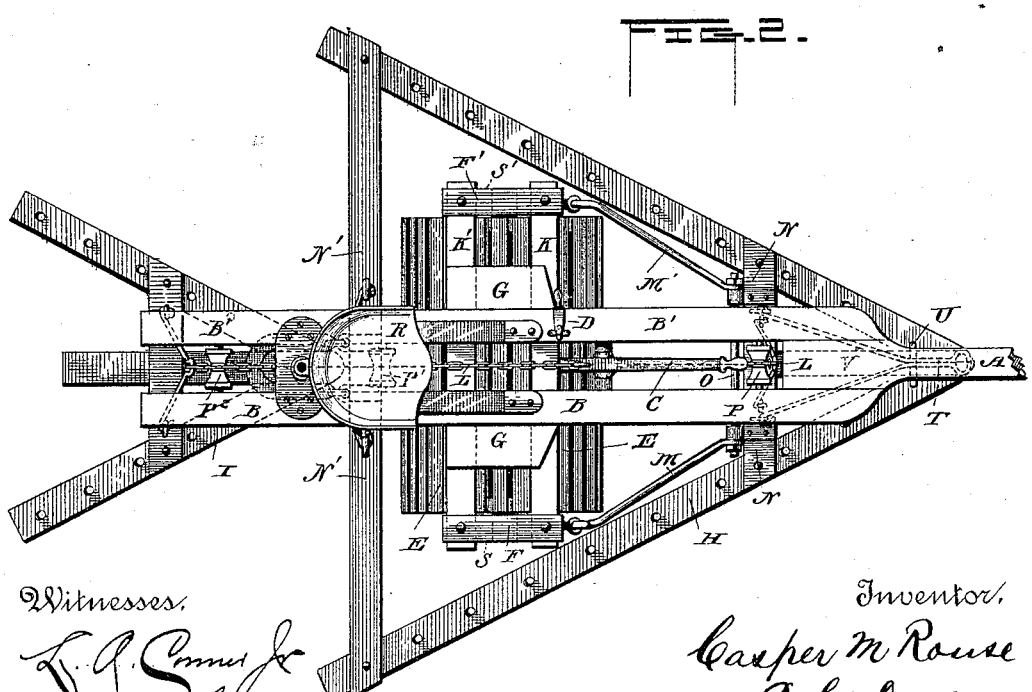
Witnesses:
Inventor:
Casper M. Rouse

UNITED STATES PATENT OFFICE.

CASPER M. ROUSE, OF LE ROY, KANSAS.

COMBINED RIDING HARROW AND ROLLER.

SPECIFICATION forming part of Letters Patent No. 402,975, dated May 7, 1889.

Application filed August 1, 1888. Serial No. 281,666. (No model.)

*To all whom it may concern:*

Be it known that I, CASPER M. ROUSE, a citizen of the United States, residing at Le Roy, in the county of Coffey and State of Kansas, have invented a new and useful Combined Riding Harrow and Roller for Agricultural Purposes; and I do hereby declare that the following is a full, clear, and exact description of the invention, which will enable others skilled in the art to which it relates to make and use the same.

My invention relates to improvements in combined riding harrows and rollers for agricultural purposes; and it consists, essentially, of two harrows and one roller adapted to revolve in the angle formed by the legs of the larger harrow, the harrows and roller being attached together and operating in the manner shown in the drawings, and as hereinafter more fully described.

My invention is an improvement upon Patent No. 221,767, dated November 18, 1879.

In the accompanying drawings, Figure 1 is a vertical sectional view of my combined riding harrow and roller. Fig. 2 is a plan view of same.

The harrows H and I are triangular shape. The leading or larger harrow has two cross-bars, N N', the first bar, N, being placed at some distance in front of the roller E, to which the roller is attached by the arms M M' in such manner that both said harrow and the roller may have free movement up and down. The second cross-bar, N', is placed at some distance behind the roller and near the rear end of said harrow, as shown in the drawings. The roller E is journaled in wooden boxes S S', which may be easily replaced by the farmer with but slight cost.

I prefer to construct the heads of the roller from two-inch plank and to cover with two-by-four scantling, placed so as to leave spaces between each scantling of about two and one-half inches, experience having shown that the roller so constructed pulverizes the clods much better than when the face of the roller is made smooth.

The draft attachment T is secured to the front cross-bars of the harrow H, and passes over and in the forked guide-pin U, which is securely fastened in and stands up from the front end of the beam V, to which the ends of the beam forming the sides of said harrow H are securely bolted. The second harrow, I, is attached at its apex to the center of the second cross-bar, N', by means of the horseshoe attachment, with two hooks, in the manner shown, so as to have free motion as a hinge.

The frame for carrying the roller E, the tongue or pole A, the pulleys P P' P'', the lever C, the hook and ratchet D, the platform G, the driver's seat R, the sunshade to driver's seat, W, and, finally, the harrows when they are raised by the lever C by means of the chains L, are constructed as follows: Two parallel cross-bars, K K', are placed at a short distance asunder and their ends securely fastened in the upper and corresponding angles of a wrought-iron frame, F F'. The opposite ends of said iron frames secure the wooden boxes S S' in which the roller E is journaled. Upon said cross-bars K K' two parallel beams, B B, are placed a short distance asunder, at right angles and at equal distance from the center of said cross-bars, to which they are securely bolted. The tongue or pole A is secured as shown, and in and upon this frame the several parts above named operate or are at rest.

In the drawings, A designates the tongue or pole; B B', two beams, between which is pivoted the lever C, the pulleys P P' P'', and upon and over which is mounted the driver's seat R, the sunshade over driver's seat, W.

E is a roller, journaled as already described.

H is a triangular-shaped harrow which surrounds the roller, and T is a small harrow hooked to the cross-bar N of larger harrow.

R R' are the cross-bars, and F F' are the wrought-iron angles holding cross-bars K K' and the wooden boxes S S' in which the roller E is journaled.

U is the forked guide-pin, over which the draft operates and keeps the front of the harrow H steady.

The lever C is connected with the chains L, which are fastened to the harrows in such a manner that both harrows may be simultaneously raised by means of the lever, so as to make the harrows run at different depth or to take them from the ground entirely and balance them upon the roller.

M M' are two arms secured to the cross-bar

N of the harrow H by means of the rod O, and are adapted to bearings which are additional to the side pieces, F F'.

I am aware that ropes, chains, levers, and pulleys have been employed for raising the harrows from the ground in riding-harrows, and I do not broadly claim the same. I am alo aware of the allowance of the patent of Benway, Rouse, and Voss, November 18, 1879, No. 221,767. (I was myself one of the petitioners.) I do not broadly claim the "shade" element.

What I claim is—

In a combined riding harrow and roller, the combination of the roller E, having bearings in wooden boxes S S' in the wrought-iron side frames, F F', with the arms M M' hinged to the cross-bar N, the harrows H and I, the harrow I having its horseshoe attachment with two hooks forming a hinge, the lever C, the chains L, the hook and ratchet D, and the forked guide-pin U, all substantially as and for the purposes set forth.

In testimony whereof I have affixed my signature in presence of two witnesses.

CASPER M. ROUSE.

Witnesses:
J. S. COVERT,
JOHN C. SEVY.